July 1, 1924.
R. V. GLOVER
1,499,576
AUTOMATIC SAFETY DEVICE FOR VEHICLES
Filed Feb. 21, 1924 2 Sheets-Sheet 1
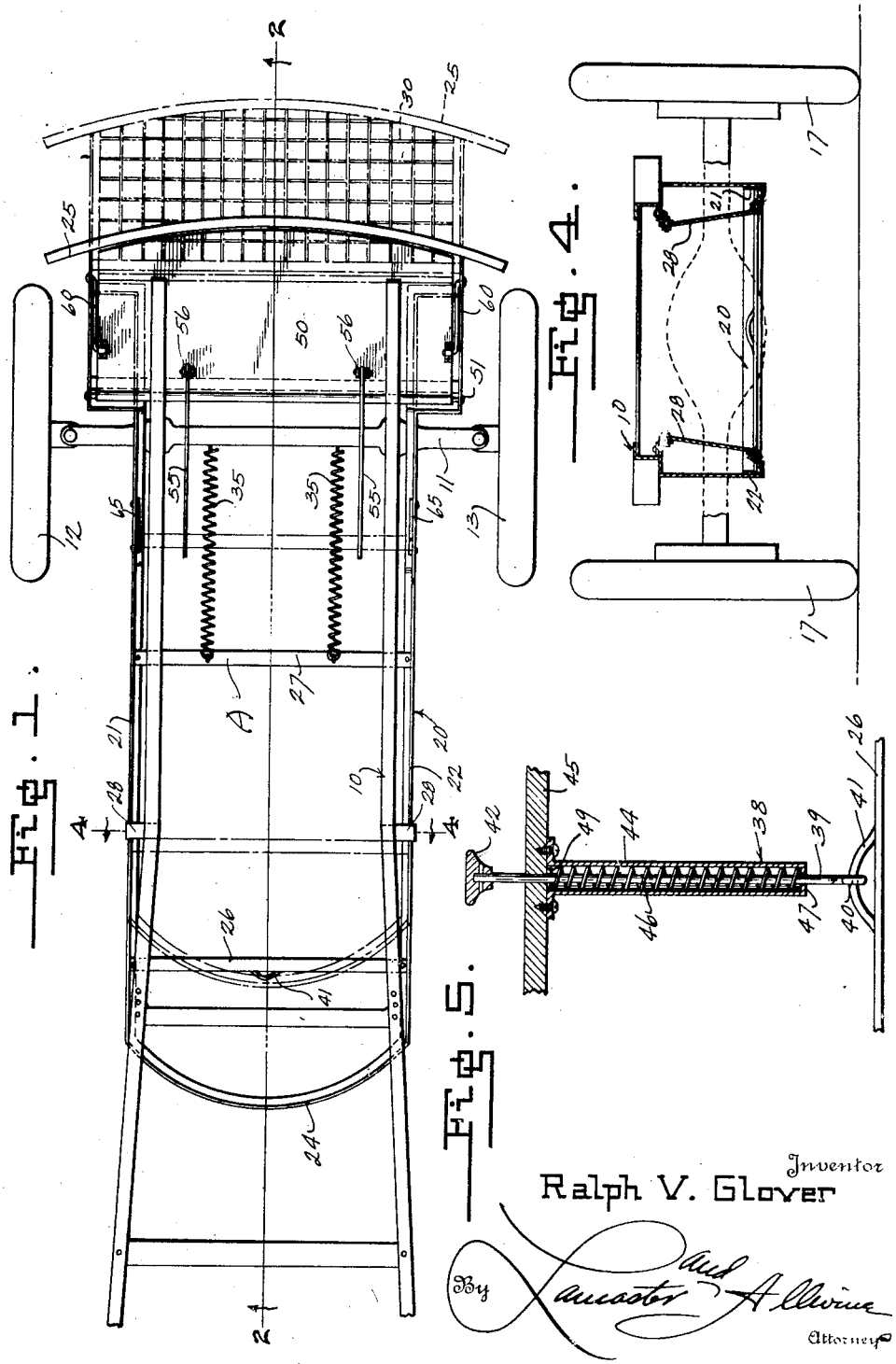
Inventor
Ralph V. Glover July 1, 1924.
R. V. GLOVER
AUTOMATIC SAFETY DEVICE FOR VEHICLES
Filed Feb. 21, 1924  2 Sheets-Sheet 2
1,499,576
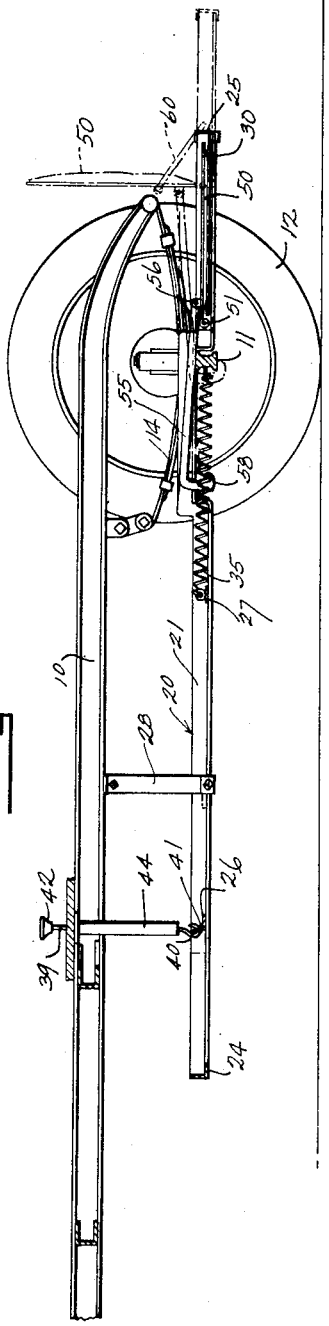
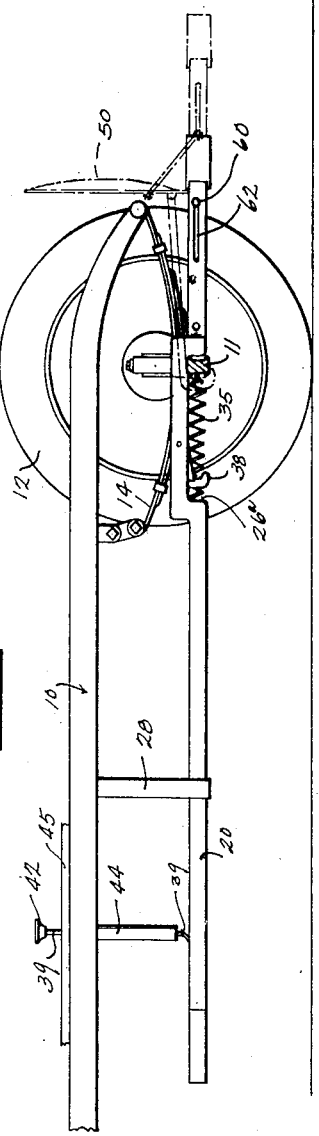
Inventor
Ralph V. Glover Patented July 1, 1924.

1,499,576

UNITED STATES PATENT OFFICE.

RALPH VINTON GLOVER, OF ROCHESTER, NEW HAMPSHIRE, ASSIGNOR OF ONE-HALF TO FANNIE HALL MATHES, OF ROCHESTER, NEW HAMPSHIRE.

AUTOMATIC SAFETY DEVICE FOR VEHICLES.

Application filed February 21, 1924. Serial No. 694,341.

*To all whom it may concern:*

Be it known that I, RALPH VINTON GLOVER, a citizen of the United States, residing at Rochester, in the county of Strafford and State of New Hampshire, have invented certain new and useful Improvements in Automatic Safety Devices for Vehicles, of which the following is a specification.

This invention relates to improvements in safety apparatus for motor vehicles.

The primary object of this invention is the provision of an extensible guard or fender arrangement for vehicles which may be quickly extended forwardly of the vehicle to prevent collision or to prevent the damage incident to collision.

A further object of this invention is the provision of a relatively simple and economical type of safety attachment for vehicles embodying an extensible fender or "bumper" attachment which may be quickly extended when a collision is imminent which cannot be avoided; the improved safety attachment including horizontally extensible means to buff the contact, and a vertically extensible guard device which when in safety position is located forwardly of the radiator of the vehicle to prevent injury thereto or injury to the person or other object with which the vehicle has collided.

Other objects and advantages of this invention will be apparent during the course of the following detailed description.

In the accompanying drawings, forming a part of this specification, and wherein similar reference characters designate corresponding parts throughout the several views—

Figure 1 is a plan view of the improved safety attachment as associated in a collapsed relation with the frame of a vehicle, showing in dotted lines the position which the improved safety attachment will assume when extended to buff the action of collision.

Fig. 2 is a cross sectional view taken longitudinally through the vehicle and safety attachment substantially on the line 2—2 of Figure 1.

Fig. 3 is a side elevation of the improved safety attachment as collapsed upon a vehicle.

Fig. 4 is a cross sectional view taken substantially on the line 4—4 of Figure 1.

Fig. 5 is a cross sectional view taken through a portion of the releasing means, and Fig. 6 is a fragmentary cross sectional view taken through a novel latch or pawl device which will hold the safety attachment in extended position to prevent accidental collapsing thereof.

In the drawings, wherein for the purpose of illustration is shown but the preferred embodiment of this invention the letter A may generally designate a vehicle of any approved character upon which the improved safety attachment B is to be used.

The vehicle A may be of any approved type, and preferably includes the chassis frame 10 forwardly mounted upon the running gear which may consist of a front axle 11 with the steering wheels 12 and 13 attached thereto in conventional manner; the forward portion of the chassis frame 10 being mounted upon this axle 11 by means of ordinary leaf springs 14. The rear of the frame 10 is, of course, supported by traction wheels 17; the rear running gear which includes these wheels 17 being partially shown in Figure 4 of the drawings.

The safety attachment B preferably includes a frame 20 constructed of angle iron or analogous material and providing the longitudinally extending side rails 21 and 22 rearwardly connected by an arcuate end rail 24 and forwardly connected by a concavo-convex bumper or fender 25. The members 21, 22, 24 and 25 are rigidly connected together, and it is preferred to provide any number of intermediate cross braces 26 and 27 necessary in order to secure the effective bracing of the frame 20.

At its forward end the frame 20 rests upon the front axle 11; the side rails 21 and 22 preferably being bent intermediate their ends to provide recesses 26ª adapted to receive the front axle 11 therein and by means of which the bumper mechanism may avoid the leaf springs 14 of the vehicle, as can readily be seen. Rearwardly the frame 20 is preferably supported by means of depending brackets 28 which may be secured to the chassis frame 10, providing suitable pockets therein for slidably receiving the side rails 21 and 22 of the safety attachment frame 20, substantially as is illustrated in Figures 3 and 4 of the drawings.

The safety device frame 20 adjacent the fender or bumper rail 25 preferably supports a wire net work 30 which is disposed in a horizontal plane, and upon which the object or person will fall as the fender or safety device is extended, as will be subsequently mentioned. Spiral springs 35 are preferably employed as a means of forcefully and quickly extending the safety attachment; an end of each of these springs being connected to the front axle 11 of the vehicle A and at their rear ends preferably being connected to the cross bar 27 of the safety attachment frame 20.

Normally the frame 20 is collapsed in a non-extended relation with respect to the front of the vehicle, and in this position the springs 35 are tensioned. To hold the safety device in this position it is preferred to provide a suitable releasing device 38 which may consist of a reciprocable hook or rod 39 at its lower end having a hook 40 for detachably engaging a loop or strand 41 formed rigid with the rear cross bar 26 of the safety device frame 20. The upper end of this rod has a pedal head 42 thereon which the operator may engage with his foot for operating the releasing device 38. A hollow cylindrical casing 44 is connected below the floor board 45 of the vehicle through which the rod 39 extends. A spring 46 of the compression type is disposed in the casing 44, at its lower end resting upon the bottom wall 47 of the casing 44, and at its upper end engaging a cross pin 49 through the rod 39. This spring normally maintains the operating rod 39 in its most elevated position with the pedal head 42 upwardly of the floor board 45 within easy reach of the operator of the vehicle. The operation of the frame upon depressing the rod 39 is obvious; the hook 40 then disengaging the loop 41, and the springs 35 then forcing the safety device frame 20 forwardly for forward extension of the bumper or fender rail 25.

It is preferred to provide means upon the improved safety attachment to prevent the object or person hit by the safety device and vehicle from falling against the radiator construction or front chassis construction of the vehicle. To this end, a frame 50 covered with some flexible material as canvas is pivotally mounted upon a pintle 51 pivotally mounted at its ends on a fixed axis in the side rails 21 and 22. This guard member 50 is normally positioned in a horizontal plane, resting upon the wire net work 30 of the safety device frame 20, and adapted to be automatically extended into a vertical plane forwardly of the radiator of the vehicle when the safety device is extended. As a means of facilitating the operation of the guard member 50 suitable hook shaped rods 55 are pivotally carried rearwardly of the guard member 50 upon pivotal points 56 offset forwardly of the pivotal axis of the member 50 when the latter is horizontally positioned. The free ends of these rods 55 are hooked, as at 58, and adapted to engage the axle 11 when the frame 20 is permitted to extend; the hook ends 58 engaging the axle just prior to the full extension of the safety attachment frame 20, and tending to thus swing the vertical guard member 50 into its vertical position, as can readily be understood. As a means of bracing and limiting the amplitude of operative positioning of the guard member 50 side braces or arms 60 may be pivotally connected to the member 50, and at their opposite ends being slidable in slots 62 which are located in the longitudinal side rails 21 and 22. These braces 60 are diagonally positioned when the bumper 50 is in its vertical position, and holds the latter in such position in a stable relation.

The operation of this device from the foregoing description is apparent. Upon depression of the releasing mechanism 39 the safety attachment frame 20 will shoot forward quickly and engage the object, throwing the object or person upon the net work 30. Prior to hitting the object or person the vertical guard 50 is, of course, elevated to its vertical position and thus the person falling against the same will not be injured by coming in contact with metal parts of the vehicle. To prevent accidental retraction of the safety attachment frame after the same is extended, suitable pawls or dogs 65 are pivotally carried by the side rails 21 and 22 of the frame 20, which at their free ends have springs 66 operating upon the same to urge them into extended relation below the lower face of these rails. As the frame is extended the rearwardly and downwardly inclined faces 67 of these dogs or pawls 65 ride over the axle 11, which depresses the dogs or pawls, but after the axle has been passed the pawl 65 assumes its normal position and any tendency to throw the safety attachment frame 20 into a collapsed relation will force the forward shoulders 68 of the pawls 65 into engagement with the front axle 11 and prevent the collapsing of the safety attachment.

Various changes in the shape, size, and arrangement of parts may be made to the form of invention herein shown and described, without departing from the spirit of this invention or the scope of the claims.

I claim:

1. In a safety attachment of the class described, the combination of a vehicle, a fender frame, means collapsibly mounting the fender frame upon the vehicle, springs normally tending to throw the fender frame forwardly of the vehicle, means for releasably holding the fender frame extended, and means for releasably retaining the fender frame collapsed.

2. In a device of the class described the combination of a frame including a front fender construction, a guard member pivotally carried just rearwardly of the front fender construction so that it will collapse into a horizontal position upon said front fender construction, and means permitting the vertical positioning of the guard member in a stable relation with respect to said fender construction and rearwardly thereof.

3. In combination with a vehicle including a frame and front axle, a supporting frame slidable upon the vehicle frame and including side bars having off-set portions positioned above the front axle and providing abutment shoulders limiting sliding movement of the supporting frame, a front fender construction supported by the supporting frame; spring means adapted to move the supporting frame for forward extension of the front fender construction, latch means carried by the off-set portions of the side bars for engaging the front axle and retaining the supporting frame in an extended position and vertical guard means operable upon extension of said supporting frame.

4. In combination with a vehicle including a front axle and frame, a safety attachment including a frame slidable upon the frame of said vehicle and resting upon said front axle, a front fender construction including a net work of wiring supported by said safety device frame, spring means normally urging the front fender construction forwardly of the vehicle, and releasable means for holding the safety attachment frame and front fender construction collapsed with respect to the vehicle.

5. In combination with a vehicle including a front axle and frame, a safety attachment including a frame slidable upon the frame of said vehicle and resting upon said front axle, a front fender construction including a net work of wiring supported by said safety device frame, spring means normally urging the front fender construction forwardly of the vehicle, releasable means for holding the safety attachment frame and front fender construction collapsed with respect to the vehicle, and vertical guard means adapted to be operated from a collapsed position into a vertical relation forwardly of the vehicle upon extension of said safety attachment.

RALPH VINTON GLOVER.